(12) United States Patent
Gourlay et al.

(10) Patent No.: US 9,350,608 B2
(45) Date of Patent: May 24, 2016

(54) METHOD AND SYSTEM FOR USING VIRTUAL TUNNEL END-POINT REGISTRATION AND VIRTUAL NETWORK IDENTIFIERS TO MANAGE VIRTUAL EXTENSIBLE LOCAL AREA NETWORK ACCESS

(71) Applicant: Arista Networks, Inc., Santa Clara, CA (US)

(72) Inventors: Douglas Alan Gourlay, San Francisco, CA (US); Kenneth James Duda, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 14/592,934

(22) Filed: Jan. 9, 2015

(65) Prior Publication Data
US 2015/0200954 A1    Jul. 16, 2015

Related U.S. Application Data

(60) Provisional application No. 61/925,910, filed on Jan. 10, 2014.

(51) Int. Cl.
*H04L 29/06* (2006.01)
*H04L 12/24* (2006.01)
(Continued)

(52) U.S. Cl.
CPC ............ *H04L 41/0816* (2013.01); *H04L 45/72* (2013.01); *H04L 45/74* (2013.01);
(Continued)

(58) Field of Classification Search
CPC ..... H04L 49/70; H04L 41/0816; H04L 47/80; H04L 45/72; H04L 45/74; H04L 49/354; H04L 63/10; H04L 63/123

USPC ............................................................. 726/4
See application file for complete search history.

(56) References Cited

U.S. PATENT DOCUMENTS

| 2014/0123212 A1* | 5/2014 | Wanser | H04L 63/10 726/1 |
| 2014/0269702 A1* | 9/2014 | Moreno | H04L 45/64 370/390 |

(Continued)

OTHER PUBLICATIONS

Mahalingam, M. et al., "Virtual Extensible Local Area Network (VXLAN): A Framework for Overlaying Virtualized Layer 2 Networks over Layer 3 Networks", retrieved at http://tools.ietf.org/html/rfc7348, Aug. 2014 (22 pages).

*Primary Examiner* — Kambiz Zand
*Assistant Examiner* — Aubrey Wyszynski
(74) *Attorney, Agent, or Firm* — Osha • Liang LLP

(57) ABSTRACT

A method and system for securing a VXLAN environment, including configuring a default network policy, associated with interfaces of the network device, for dropping all VXLAN frames including a VXLAN attribute; obtaining, by the network device, registered VTEP identifiers; determining, using the registered VTEP identifiers, that an interface of the network device is operatively connected to a registered VTEP associated with a registered VTEP identifier; disassociating the default network policy from the interface based on the determination; receiving, at the interface, a frame; performing a first verification that the frame is a VXLAN frame by examining the frame to determine that the frame includes the VXLAN attribute; performing a second verification to determine that the VXLAN frame includes a registered VTEP identifier; allowing, based on the first verification and the second verification, the network device to process the VXLAN frame; and processing the VXLAN frame.

20 Claims, 5 Drawing Sheets

(51) Int. Cl.
*H04L 12/927* (2013.01)
*H04L 12/721* (2013.01)
*H04L 12/741* (2013.01)
*H04L 12/931* (2013.01)

(52) U.S. Cl.
CPC ............. *H04L 47/80* (2013.01); *H04L 49/354* (2013.01); *H04L 49/70* (2013.01); *H04L 63/10* (2013.01); *H04L 63/123* (2013.01)

(56) References Cited

U.S. PATENT DOCUMENTS

2015/0009992 A1* 1/2015 Zhang ................. H04L 12/4633
370/392
2015/0063102 A1* 3/2015 Mestery ................. H04L 41/12
370/230
2015/0244617 A1* 8/2015 Nakil ..................... H04L 45/70
709/224

* cited by examiner

METHOD AND SYSTEM FOR USING VIRTUAL TUNNEL END-POINT REGISTRATION AND VIRTUAL NETWORK IDENTIFIERS TO MANAGE VIRTUAL EXTENSIBLE LOCAL AREA NETWORK ACCESS

CROSS-REFERENCE TO RELATED APPLICATIONS

This application claims benefit under 35 U.S.C. §119(e) to U.S. Provisional Patent Application Ser. No. 61/925,910, filed on Jan. 10, 2014 and titled, "METHODS AND SYSTEMS FOR NETWORK VIRTUALIZATION." U.S. Provisional Patent Application Ser. No. 61/925,910 is incorporated herein by reference in its entirety.

BACKGROUND

Computer networks typically facilitate communication between multiple computing devices that are operatively connected to one another via one or more network devices. Computing devices often send data to and receive data from other computing devices via the network devices of the computer network.

Computer networks are, at times, subject to attempts at unauthorized access and/or activity on the network. Such unauthorized activity may include, but is not limited to, the injection of packets and/or frames into the network that have been crafted in such a way as to appear to be from and/or headed to computing devices that are authorized to transmit in the network.

SUMMARY

In general, in one aspect, the invention relates to a method for securing a virtual extensible local area network (VXLAN) environment. The method includes configuring a default network policy on a network device for dropping all VXLAN frames that include a VXLAN attribute. The network policy is associated with a plurality of interfaces of the network device. The method also includes obtaining, by the network device, a plurality of registered VXLAN tunnel endpoint (VTEP) identifiers; determining, using the plurality of registered VTEP identifiers, that a first interface of the plurality of interfaces of the network device is operatively connected to a first registered VTEP associated with a first registered VTEP identifier of the plurality of registered VTEP identifiers; disassociating the default network policy from the first interface based on the determination that the first interface is operatively connected to the first registered VTEP; receiving, at the first interface of the network device, a frame; performing a first verification that the frame is a first VXLAN frame by examining the frame to determine that the frame includes the VXLAN attribute; performing a second verification to determine that the first VXLAN frame includes a first registered VTEP identifier; allowing, based on the first verification and the second verification, the network device to process the first VXLAN frame; and processing, by the network device, the first VXLAN frame.

In general, in one aspect, the invention relates to a system used to secure a virtual extensible local area network (VXLAN) environment. The system includes a computing device configured to transmit a first media access control (MAC) frame to a first registered virtual tunnel end point (VTEP); the first registered VTEP that includes functionality to send a first VXLAN frame to a network device; and a network device operatively connected to the first computing device that includes first interface and a default network policy that is associated with a plurality of interfaces of the network device for dropping VXLAN frames that include a VXLAN attribute. The network device includes functionality to obtain a plurality of registered VXLAN tunnel endpoint (VTEP) identifiers; determine, using the plurality of registered VTEP identifiers, that the first interface is operatively connected to a first registered VTEP associated with a first registered VTEP identifier of the plurality of registered VTEP identifiers; disassociate the default network policy from the first interface based on the determination that the first interface is operatively connected to the first registered VTEP; receive, at the first interface of the network device, a frame; perform a first verification that the frame is a first VXLAN frame by examining the frame to determine that the frame includes the VXLAN attribute; perform a second verification to determine that the first VXLAN frame includes a first registered VTEP identifier; allow, based on the first verification and the second verification, the network device to process the first VXLAN frame; and process the first VXLAN frame.

In general, in one aspect, the invention relates to a non-transitory computer readable medium that includes instructions, which, when executed by a processor, perform a method for securing a virtual extensible local area network (VXLAN) environment. The method includes configuring a default network policy on a network device for dropping all VXLAN frames that include a VXLAN attribute; The default network policy is associated with a plurality of interfaces of the network device. The method also includes obtaining, by the network device, a plurality of registered VXLAN tunnel endpoint (VTEP) identifiers; determining, using the plurality of registered VTEP identifiers, that a first interface of the plurality of interfaces of the network device is operatively connected to a first registered VTEP associated with a first registered VTEP identifier of the plurality of registered VTEP identifiers; disassociating the default network policy from the first interface based on the determination that the first interface is operatively connected to the first registered VTEP; receiving, at the first interface of the network device, a frame; performing a first verification that the frame is a first VXLAN frame by examining the frame to determine that the frame includes the VXLAN attribute; performing a second verification to determine that the first VXLAN frame includes a first registered VTEP identifier; allowing, based on the first verification and the second verification, the network device to process the first VXLAN frame; and processing, by the network device, the first VXLAN frame.

Other aspects and advantages of the invention will be apparent from the following description and the appended claims.

DETAILED DESCRIPTION

Figure 1:
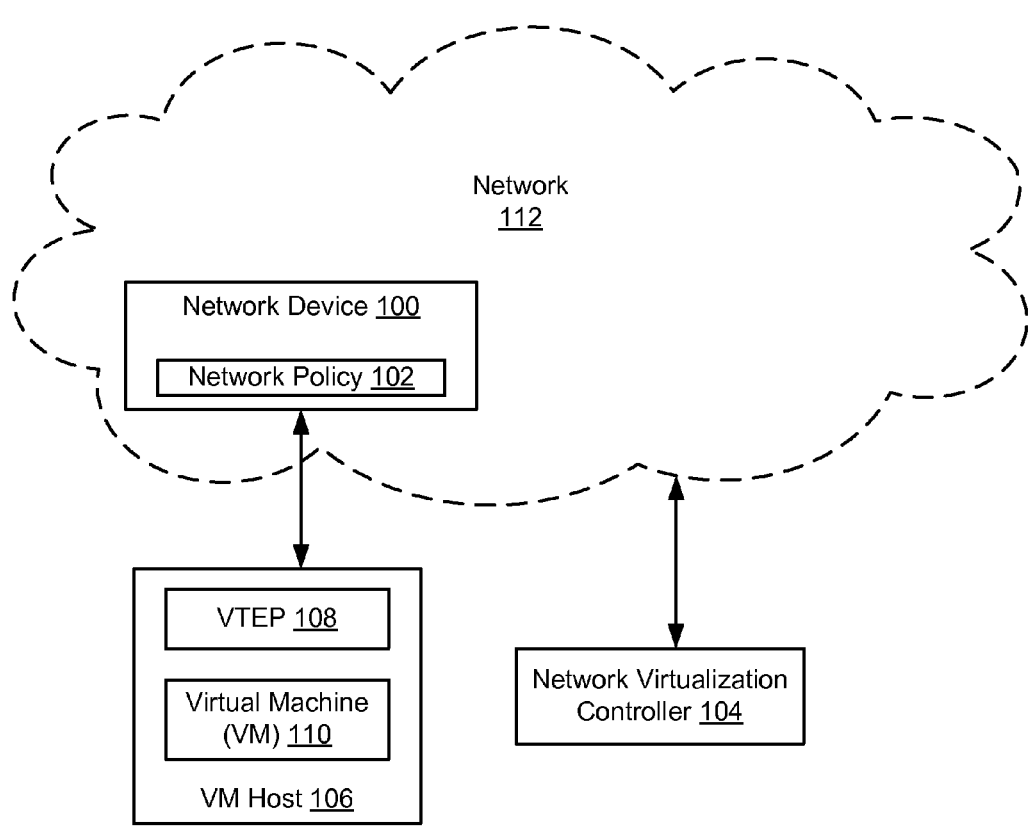
FIG. 1 shows a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art and having the benefit of this disclosure that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to securing, at least in part, a computer network in which a Virtual eXtensible Local Area Network (VXLAN) framework is deployed. More specifically, embodiments of the invention relate to the use by a network device of one or more VXLAN attributes of a VXLAN frame (e.g., UDP port number) to identify VXLAN frames, which are either dropped or processed by the network device depending on whether or not the interface of the network device at which the VXLAN frame arrived is operatively connected to a registered VXLAN Tunnel End-Point (VTEP). One or more embodiments of the invention relate to a determination to drop a VXLAN frame or process the VXLAN frame based on a VXLAN (or Virtual) Network Identifier (VNI) of the VXLAN frame. VXLAN frames necessarily include a VNI. In one or more embodiments of the invention, a network device examines a received VXLAN frame to obtain the VNI therein. The VTEP that sent the VXLAN frame is authorized to transmit in one or more VXLANs, each identified by a corresponding VNI. If the VNI obtained by the network device is not one of the one or more VNIs that identify a VXLAN that the sending VTEP is authorized to transmit in, the VXLAN frame may be dropped.

In one or more embodiments of the invention, methods to secure VXLAN use, at least in part, the VXLAN protocol. One version of the VXLAN protocol is defined in the document entitled "VXLAN: A Framework for Overlaying Virtualized Layer 2 Networks over Layer 3 Networks" version 09 dated Apr. 10, 2014. The VXLAN protocol is hereby incorporated by reference in its entirety. The invention is not limited to a particular version of VXLAN.

FIG. 1 shows a system in accordance with one or more embodiments of the invention. In one or more embodiments of the invention, the system includes a network virtualization controller (104) operatively connected to a network device (100) via a network (112). The network device (100) may include one or more network policies (e.g., network policy (102)). The network device (100) may be operatively connected to a virtual machine (VM) host (106). The VM host may include a VM (110) as well as a Virtual Tunnel End-Point (VTEP) (108). Each of these components is described below.

In one or more embodiments of the invention, a network (112) is a collection of one or more network devices (e.g., network device 100) that facilitate network connectivity for one or more computing devices (e.g., VM host (106), network virtualization controller (104)). In one or more embodiments of the invention, the network (112) may be all or a portion of a computer network. A computer network may include a datacenter network, a wide area network, a local area network, a wireless network, a cellular phone network, any other suitable network that facilitates the exchange of information from one part of the network to another, and/or any combination thereof. In one or more embodiments, the network (100) is coupled with or overlaps with the Internet.

In one or more embodiments of the invention, a network virtualization controller (104) is software and/or hardware that includes functionality to, at least in part, manage a VXLAN framework. A network virtualization controller (104) may execute on a network device of the network, (e.g., a switch and/or a router), or on a computing device (e.g., a physical machine or a VM) operatively connected to the network (112). In one or more embodiments of the invention, a network virtualization controller includes functionality to send information to or receive information from one or more VTEPs (e.g., VTEP (108)). A network virtualization controller may include functionality to facilitate registration of one or more VTEPs. A network virtualization controller (104) may include functionality to distribute VTEP information (e.g., information regarding registered VTEPs) to network devices (e.g., network device (100)) in the network (112).

In one or more embodiments of the invention, the network (112) includes one or more network devices (e.g., network device (100)). In one or more embodiments of the invention, a network device (100) is a switch and/or a router. In one or more embodiments of the invention, the network device (100) facilitates, at least in part, communication between operatively connected computing devices (e.g., VM host (106)) and other computing devices operatively connected to the network.

A switch is a physical device that includes persistent storage, memory (e.g., Random Access Memory), one or more processors, and two or more physical ports (i.e., interfaces). Each port may or may not be connected to another device (e.g., a server, a switch, a router, a network virtualization controller, etc.). A switch may be configured to receive frames (e.g., Media Access Control (MAC) frames, VXLAN frames) via the ports and determine whether to (i) drop the frame, (ii) process the frame in accordance with one or more embodiments of the invention, and/or (iii) send the frame, based on the processing, out another port on the switch. How a switch makes the determination of whether to drop the frame or send the frame to another device on the network may depend, in part, on whether the switch is a layer-2 (L2) switch or a layer-3 (L3) switch (also referred to as a multi-layer switch), which may perform at least some functions of a router. If the switch is operating as a L2 switch, the switch uses the destination MAC address along with a forwarding table to determine out of which port to send the frame. If the switch is operating as a L3 switch, the switch uses the destination IP address along with a routing table to determine out of which port to send the frame. If the switch is a multi-layer switch, the multi-layer switch includes functionality to process frames using both MAC addresses and IP addresses.

A router is a network device that is operatively connected to two or more networks and/or network segments and includes functionality to communicate frames between the networks and/or network segments. A router, similar to the L3 switch described above, uses destination IP addresses and a routing table to determine a route to the destination computing device. The routing table may include the MAC address of the next-hop device along that route, which is written as the destination MAC address of the MAC frame or VXLAN frame. The router may then send the frame out of an interface operatively connected to the next-hop device.

In one or more embodiments of the invention, the network device (100) includes one or more network policies (e.g., network policy (102)). In one or more embodiments of the invention, a network policy (102) configured on a network device (100) allows a network device to make a determination about whether to deny/drop a frame, process the frame, and/or send the frame to another device on the network. A network policy (102) may include one or more rules that indicate a given action be preformed in the event that a frame arrives at an interface of a network device (100). For example, a network policy may indicate that any VXLAN frame arriving at an interface of the network device from a given source IP address is to be dropped. Network policies may be used to allow processing of frames, deny or drop frames, shape traffic patterns, provide specified levels of service quality, and/or any other action relevant to data being transmitted via a network.

In one or more embodiments of the invention, the network device is operatively connected to one or more computing devices (e.g., VM host (106)). In one or more embodiments of the invention, a computing device is any device (or set of devices) capable of electronically processing instructions and that includes at least the minimum processing power, memory, input and output device(s), ability to generate and/or receive MAC frames, and network connectivity to perform, at least in part, one or more embodiments of the invention. A computing device may be any physical or virtual machine and/or system capable of electronically processing instructions. For example, a computing device may be a server, blade in a blade-server chassis, a desktop computer, a mobile device (e.g., laptop computer, smart phone, tablet computer, or other mobile device), a network attached storage (NAS) device, or any other type of computing device or devices that includes at least the minimum processing power, memory, input and output device(s), and network connectivity to perform, at least in part, one or more embodiments of the invention.

In one or more embodiments of the invention, one or more computing devices attached to the network device (100) are servers. A server may include any type of system (e.g., software and/or computer hardware) that is configured to generate, send, receive, and/or process requests and replies either locally or over a network using software and/or computer hardware. The server may include one or more processors, memory, and one or more physical network interfaces. Examples of types of servers include, but are not limited to, VM hosts (e.g., VM host (106)), database servers, dynamic host configuration protocol (DHCP) servers, application servers, file servers, print servers, and mail servers.

In one or more embodiments of the invention, a VM host (106) includes functionality to host one or more VMs (e.g., VM (110)). A VM (110) is a software-based emulation of a computing device. A VM may be assigned all or a portion of the various hardware included in the physical computing device that is serving as the VM host (106). Hosting a VM (110) includes, but is not limited to, providing the VM the hardware resources assigned to the VM, scheduling time for the VM to use various physical hardware resources (e.g., processor, memory, network interfaces, etc.), and translating instructions from the VM into instructions that are understood by the underlying physical hardware, operating system, and/or hypervisor of the VM host (106). In one or more embodiments of the invention, a VM host (106) includes a hypervisor (not shown). A hypervisor (i.e., virtual machine monitor) is computer software that includes the ability to create, execute, and/or, at least in part, manage VMs executing on a VM host (106). In other embodiments of the invention, the VM host (106) includes an operating system on which a VM executes.

In one or more embodiments of the invention, a VM (110) includes functionality to generate and/or receive MAC frames. A VM host (104) on which a VM (110) executes that is assigned to a particular VXLAN segment identified by a VNI may include a VTEP (108). A VTEP (108) is software and/or computer hardware which originates and/or terminates VXLAN tunnels and may be capable of, at least: (i) encapsulating a MAC frame generated by a computing device (e.g., VM (110)) to obtain a VXLAN frame; (ii) sending the obtained VXLAN frame towards a VTEP operatively connected to a destination computing device; and (iii) receiving a VXLAN frame destined for an operatively connected destination computing device (e.g., VM (110)) and de-encapsulating the MAC frame therein before delivering the MAC frame to the destination computing device. MAC frames and VXLAN frames are discussed further in the description of FIG. 2, below.

FIG. 1 shows one network device of a network having one network policy, where the network device is operatively connected to (i) one VM host on which one VM and one VTEP are executing, and (ii) one network virtualization controller. However, one skilled in the art and having the benefit of this disclosure will recognize that the quantity and/or arrangement of any or all of these components may vary according to the requirements of the system without departing from the scope of the invention. For example, the network may contain any number of network devices. The network devices of the network may be arranged in any manner suitable to meet the needs of the system. For example, there may be several layers of network devices arranged hierarchically. Any or all network devices of the network may include any number of network policies as required by the demands placed on the network devices. One or more embodiments of the invention may be implemented, at least in part, on any network device(s) in any layer of the network, or an all network devices of a network. The system may also include any number of network virtualization controllers for managing, at least in part, a VXLAN framework. The system may include any number of VM hosts on which any number of VMs execute.

Furthermore, although FIG. 1 shows a VM host connected to the network device, one skilled in the art and having the benefit of this disclosure will recognize that the operatively connected computing device may be any computing device capable of communicating via a network. In embodiments of the invention in which the computing device attached to the network device is not a VM host, there may be a VTEP executing on one or more network devices in the network that facilitate participation in a VXLAN for operatively connected computing devices. Alternatively, the VTEP may be executing on the computing device.

The invention is not limited to the system configuration shown in FIG. 1.

Figure 2:
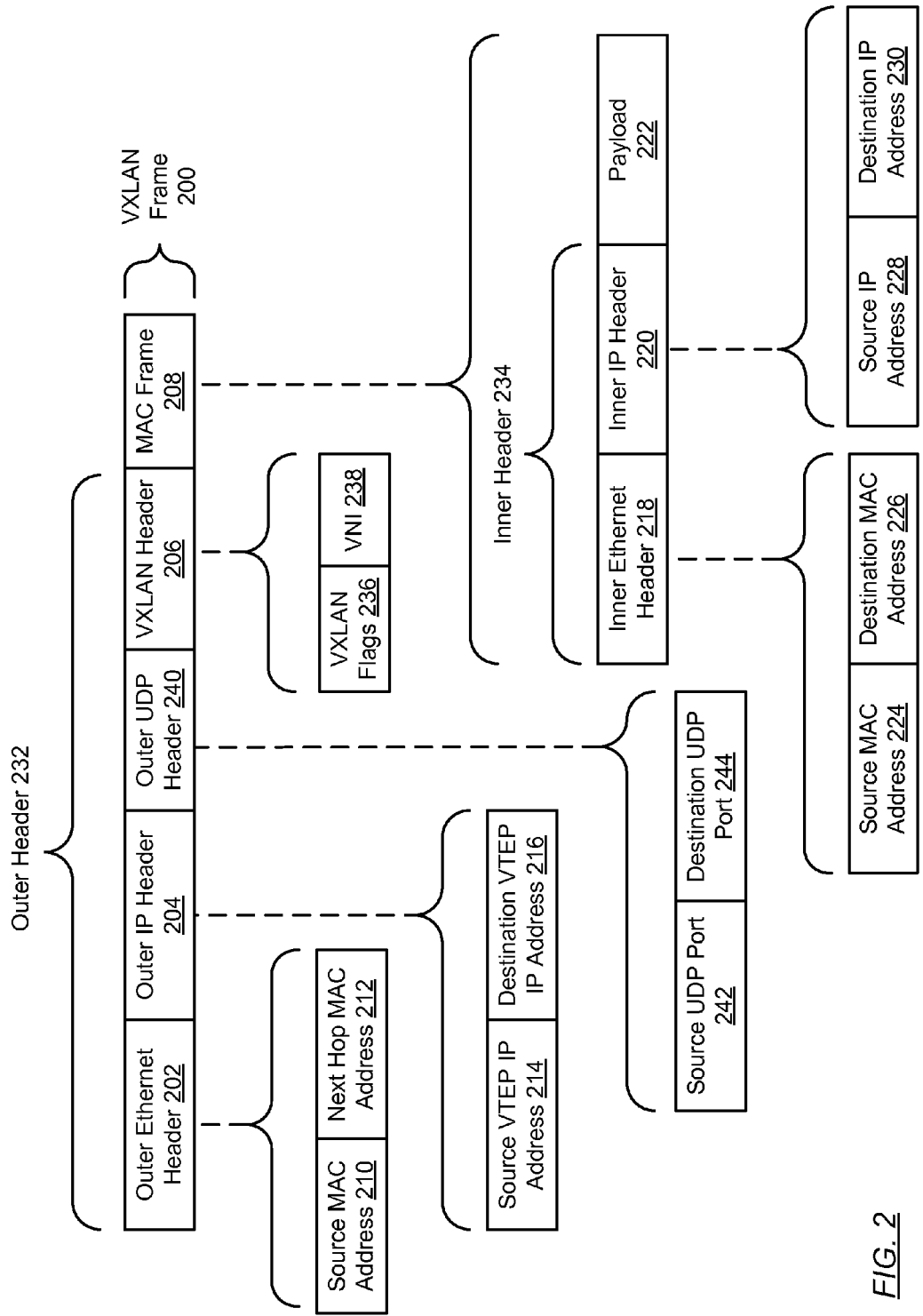
FIG. 2 shows a VXLAN frame in accordance with one or more embodiments of the invention.

FIG. 2 shows a VXLAN frame in accordance with one or more embodiments of the invention. The VXLAN frame (200) includes, at least: (i) a MAC frame (208), (ii) a VXLAN header (206), (iii) an outer Universal Datagram Protocol (UDP) header (240); (iv) an outer IP header (204), and (v) an outer Ethernet header (202). Each of the aforementioned components is described below.

In one or more embodiments of the invention, the MAC frame (208) is generated by a source computing device (e.g., a VM, a server, etc.) and may include an inner header (234) and a payload (222). The payload (222) may include the content that the source computing device is attempting to transmit to the destination computing device. The inner header (234) includes an inner Ethernet header (218) and an inner IP header (220). The inner Ethernet header (218) includes a source MAC address (224), and a destination MAC address (226). The inner IP header (220) includes a source IP address (228) and a destination IP address (230). The MAC frame may include other information/content without departing from the invention.

In one or more embodiments of the invention, the VXLAN header (206) includes, but is not limited to, a VXLAN network identifier (VNI) (238) and one or more VXLAN flags (236). The VNI (238) identifies the scope of the MAC frame (208) originated by the computing device such that the MAC frame (208) may only be sent to destination computing devices associated with the same VNI. The MAC frame may be sent to a computing device associated with a different VNI if the MAC frame is routed into a new VXLAN L2 domain. VXLAN flags may be an eight bit field in which an "I" flag is set to one to indicate a valid VNI while the remaining seven bits are set to zero on transmit and ignored on receive. The VXLAN header may include other information and/or content without departing from the invention.

In one or more embodiments of the invention, the outer UDP header (240) includes, but is not limited to, a source UDP port (242) and a destination UDP port (244). The source UDP port (242) may be a value obtained by the source VTEP when encapsulating a MAC frame into a VXLAN frame. For example, the source UDP port may be a hash of one or more fields from the MAC frame. The destination UDP port may be a port value provided by a source VTEP. In one or more embodiments of the invention, the destination UDP port is constant within a VXLAN framework and known to the VTEPs therein and may be used to identify a VXLAN frame. For example, the destination UDP port may be the value 4789, which is a UDP port number assigned by the Internet Assigned Numbers Authority (IANA) for use as the destination UDP port in a VXLAN frame.

In one or more embodiments of the invention, the outer Ethernet header (202) and the outer IP header (204) are used to route the VXLAN frame from the source VTEP to the destination VTEP. To this end, the outer Ethernet header (202) includes the source MAC address (210) and the next hop MAC address (212) and the outer IP header (204) includes the source VTEP IP address (214) and the destination VTEP IP address (216). The aforementioned components may include other information/content without departing from the invention. The outer Ethernet header (202), the outer IP header (204), outer UDP header (240), and the VXLAN header (206) may be collectively referred to as an outer header (232). The information included in the outer header (232), or any portion therein, may be referred to as a VXLAN attribute. For example, the destination UDP port in the outer UDP header may be referred to as a VXLAN attribute.

The VXLAN frame may include other components without departing from the invention.

Figure 3:
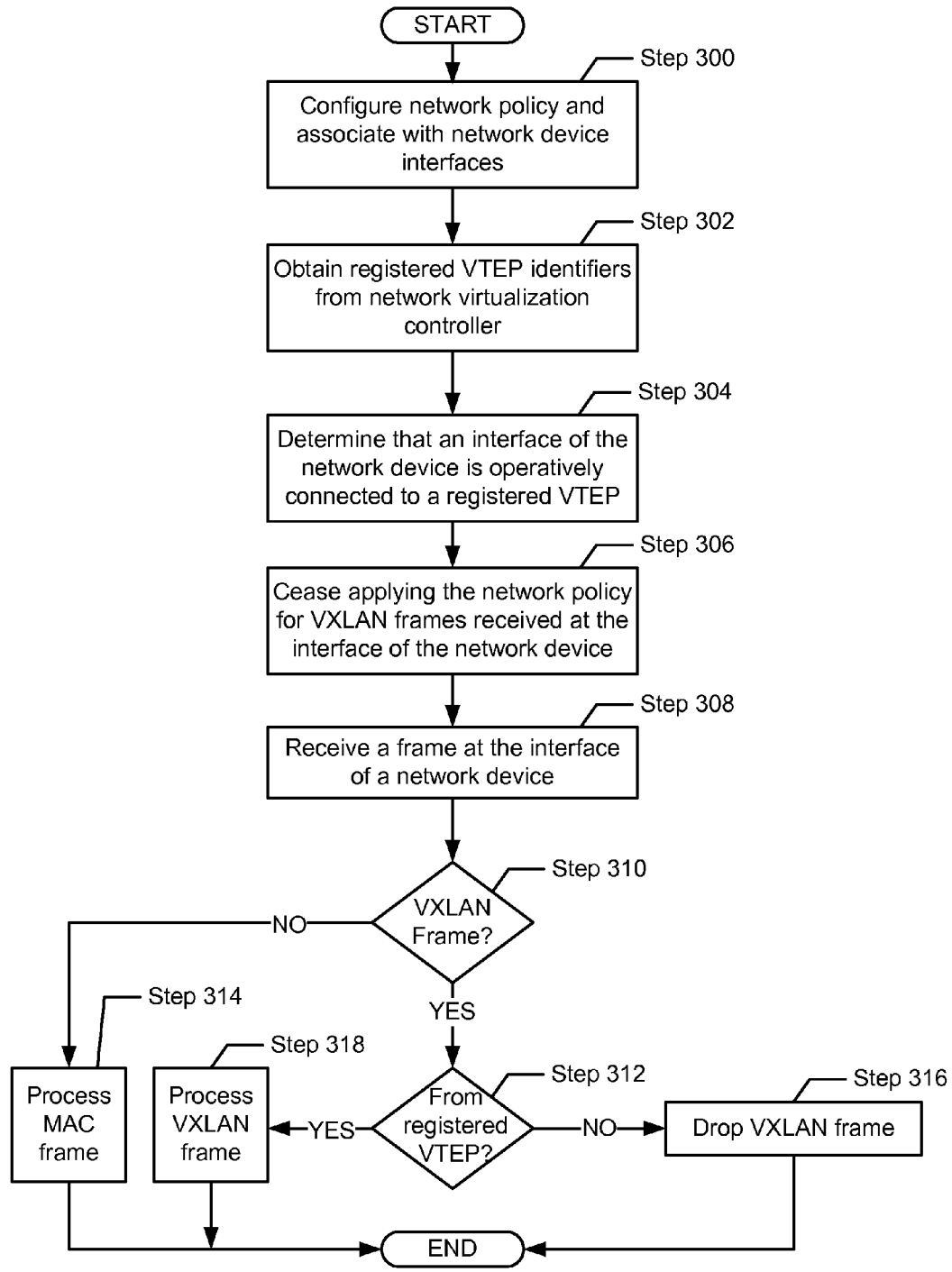
FIG. 3 shows a method for securing VXLAN using VTEP registration and VXLAN attributes in accordance with one or more embodiments of the invention.
Figure 4:
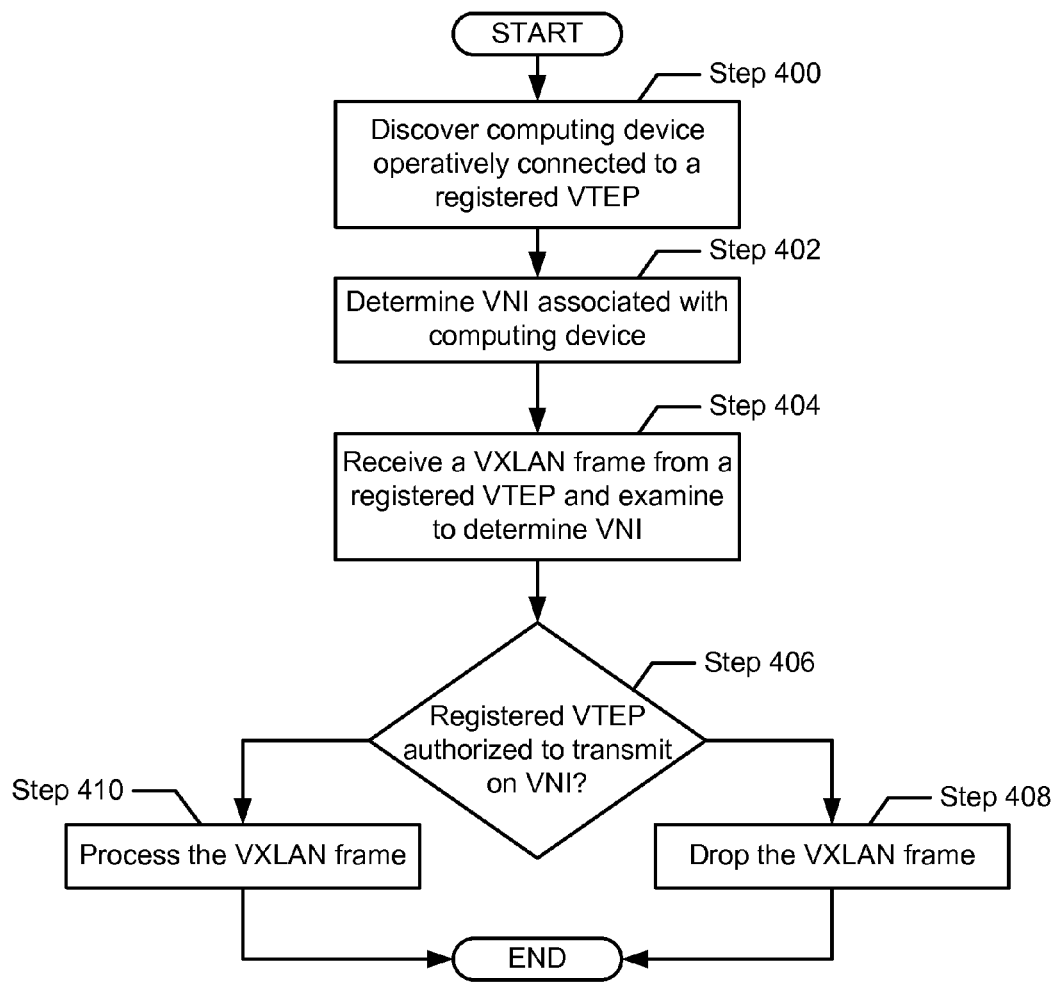
FIG. 4 shows a method for applying a network policy based on a VNI in accordance with one or more embodiments of the invention.

FIGS. 3 and 4 show flowcharts in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel. In one embodiment of the invention, the steps shown in FIGS. 3 and/or 4 may be performed in parallel with any other steps shown in FIGS. 3 and/or 4 without departing from the invention. Furthermore, the determination steps may be active steps or passive steps. An active determination step may be one in which an entity performs an action, such as a processor executing an instruction, or a value being compared/tested. A passive determination step may be a point in the process where the flow of the process merely splits based on the existence, or lack thereof, a given condition.

Turning to FIG. 3, FIG. 3 shows a method for securing VXLAN using VTEP registration and one or more VXLAN attributes in accordance with one or more embodiments of the invention. In Step 300, a network policy is configured and associated with interfaces of a network device. In one or more embodiments of the invention, the network policy is a rule that any VXLAN frame that includes a VXLAN attribute received at an interface of the network device is to be dropped. There may be only one network policy that applies to all interfaces of a network device, or any portion thereof. There may alternatively be one network policy per interface, each of which includes the same rule. In embodiments of the invention in which there are more than one network device, the network policy may be implemented on all of the network devices of the network or any portion thereof. In one or more embodiments of the invention, the network device is configured such that the network policy for dropping VXLAN frames is implemented as a default setting on the network device for all interfaces.

In Step 302, one or more registered VTEP identifiers are obtained from a network virtualization controller. In one or more embodiments of the invention, a VTEP becomes a registered VTEP when it is registered with a network virtualization controller. A registered VTEP is a VTEP that is registered with at least one network virtualization controller as authorized to transmit in one or more VXLAN segments. A VTEP identifier may be any information capable of identifying a VTEP. A registered VTEP identifier may be any VTEP identifier that identifies a registered VTEP. For example, the IP address of a VTEP may be used as a registered VTEP identifier. In one or more embodiments of the invention, the network device is configured to query, periodically or aperiodically, the network virtualization controller for a list of registered VTEP identifiers. In other embodiments of the invention, the network virtualization controller is configured to periodically or aperiodically transmit a list of registered VTEPs to one or more network devices.

In Step 304, the network device determines that an interface of the network device is operatively connected to a registered VTEP. In one or more embodiments of the invention, the network device obtains information regarding the computing devices and/or network devices operatively connected to one or more interfaces of the network device. For example, a discovery protocol may be used to discover information related to operatively connected computing devices and/or network devices. In other embodiments of the invention, computing devices are configured to periodically and/or aperiodically send information to the network device. In one or more embodiments of the invention, information discovered, obtained, and/or received by the network device includes one or more VTEP identifiers of one or more VTEPs executing on and/or in conjunction with one or more operatively connected computing devices (e.g., VM hosts). In one or more embodiments of the invention, information discovered, obtained, and/or received by the network device includes one or more VTEP identifiers of one or more VTEPs executing on another network device. The network device may include functionality to assess the discovered, obtained, or received VTEP identifiers with regard to the list of registered VTEP identifiers obtained in Step 302 to determine which interfaces of the network device are operatively connected to a registered VTEP.

In Step 306, the network device ceases applying the network policy to VXLAN frames received at an interface of the network device determined in Step 304 to be operatively connected to a registered VTEP. In one or more embodiments of the invention, ceasing application of the network policy includes creating an exception in the network policy for interfaces determined to be connected to a registered VTEP such that VXLAN frames arriving at those interfaces are processed rather than dropped by the network device. In other embodiments of the invention, ceasing application of the network policy includes removing/canceling/disassociating a network policy for dropping VXLAN frames that was previously applied to interfaces operatively connected to a registered VTEP while leaving network policies for denying/dropping VXLAN frames in place for any interface or network device that is not determined to be operatively connected to a registered VTEP.

In Step 308, a frame (i.e., either a MAC frame or a VXLAN frame) is received at an interface of the network device that was determined in Step 304 to be operatively connected to a registered VTEP. In one or more embodiments of the invention, receiving a frame at an interface of a network device includes detecting an electronic signal arriving at an interface that communicates the bits included in a frame to the network device.

In Step 310, a determination is made as to whether or not the received frame is a VXLAN frame. In one or more embodiments of the invention, the determination is made by the network device by examining the received frame to determine if it includes one or more VXLAN attributes. For example, the frame may be examined to determine if the destination UDP port is a UDP port value associated with VXLAN (e.g., IANA-assigned UDP port 4789). If the received frame is determined to be a VXLAN frame, the process proceeds to Step 312. If the received frame is determined to not be a VXLAN frame (e.g., a MAC frame), the process proceeds to Step 314. In Step 314, the received MAC frame (i.e., not a VXLAN frame) is processed by the network device and then the process ends.

Turing to Step 312, In Step 312, a determination is made as to whether or not the received frame that was determined to be a VXLAN frame in Step 310 appears to be sent from a registered VTEP known to be operatively connected to the interface at which the VXLAN frame was received in Step 308. In one or more embodiments of the invention, determining that the VXLAN frame was sent from a registered VTEP includes examining the received VXLAN frame to obtain a VTEP identifier therein. The VTEP identifier of the received VXLAN frame may be compared with a registered VTEP identifier. The registered VTEP identifier may be the VTEP identifier of a registered VTEP that is operatively connected to the interface at which the VXLAN frame was received. In one or more embodiments of the invention, if the VTEP identifier of the received VXLAN frame matches the registered VTEP identifier of the operatively connected VTEP, then the process proceeds to step 318. In one or more embodiments of the invention, if the VTEP identifier of the received VXLAN frame does not match the registered VTEP identifier of the operatively connected VTEP, then the process proceeds to Step 316. In Step 316, the network device denies/drops the VXLAN frame and then the process ends.

Turning to Step 318, in Step 318, the VXLAN frame is processed by the network device. Processing the VXLAN frame may include allowing the VXLAN frame to be processed in accordance with the included functionality of the network device. Processing the VXLAN frame by the network device may include applying one or more additional network policies to the VXLAN frame, propagating the VXLAN frame through the network device, preparing the VXLAN frame to be sent from an interface of the network device, and/or sending the VXLAN frame from an interface of the network device. After the VXLAN frame is processed, the process ends.

Turning to FIG. 4, FIG. 4 shows a method for applying a network policy based on a VNI in accordance with one or more embodiments of the invention. In Step 400, the network device discovers one or more computing devices operatively connected to a registered VTEP that is operatively connected to an interface of the network device. In one or more embodiments of the invention, the computing device is a VM and is executing on the same VM host as the registered VTEP. In other embodiments of the invention, the computing device is a physical machine and the VTEP is executing on another network device and/or on the computing device. In one or more embodiments of the invention, a discovery protocol is used, in part, to discover the computing device. Discovery of a computing device may include discovery of information associated with the computing device (e.g., IP address, MAC address, name, universally unique identifier, etc.).

In Step 402, the network device determines a VNI with which the computing device is associated. A network device may use information associated with the computing device (e.g., MAC address, IP address, etc.) discovered in Step 400 to determine the associated VNI. In one or more embodiments of the invention, information relating computing devices to the one or more VNIs to which they are assigned is stored on the network device. Additionally or alternatively, the information relating computing devices to the one or more VNIs to which they are assigned may be obtained by request from a network virtualization controller or any other entity capable of communicating the information to the network device. The network device may include functionality to receive information regarding the VNI to which a computing device is assigned from any other network device, computing device, and/or network virtualization controller that is a part of and/or is operatively connected to the network. A VNI determined to be the VNI to which the computing device is assigned may be used as an indication that the registered VTEP to which the computing device is operatively connected is authorized to transmit in the determined VNI. In one or more embodiments of the invention, the network device includes functionality to store record of VNIs on which operatively connected registered VTEPs are authorized to transmit. The network device may include functionality to learn and store mappings between VNIs and computing devices via examination of received VXLAN frames. For example, the MAC frame encapsulated in the received VXLAN frame may include information (e.g., source MAC address, source IP address) that identifies the source computing device. The VXLAN header of the received VXLAN frame may include a VNI. A mapping between information identifying the source computing device and the VNI may then be stored by the network device.

In Step 404, a VXLAN frame is received from a registered VTEP and examined to determine the VNI included in the VXLAN frame. In one or more embodiments of the invention, receiving a VXLAN frame at an interface of a network device includes detecting an electronic signal arriving at an interface that communicates the bits included in a frame to the network device. In one or more embodiments of the invention, prior to Step 404, Steps 310-318 of FIG. 3 are performed on the VXLAN frame to determine that (i) the frame is a VXLAN frame, and (ii) that the VXLAN frame includes the expected registered VTEP identifier. In one or more embodiments of the invention, once the frame has been determined to be a VXLAN frame from a registered VTEP, then the VNI is determined. Determining a VNI may include examining the VXLAN header of the VXLAN frame in order to determine the VNI included therein.

In Step 406, a determination is made regarding whether or not the registered VTEP that sent the VXLAN frame is authorized to transmit on the VNI of the VXLAN frame that was determined in Step 404. In one or more embodiments of the invention, determining whether or not the registered VTEP is authorized to transmit on the VNI of a received VXLAN frame includes determining if the VNI of the VXLAN frame matches any VNI on which the registered VTEP is known by the network device to be authorized to transmit. For example, the VNI to which the computing device is assigned that was discovered in Step 402 is a VNI on which the registered VTEP is authorized to transmit. If the registered VTEP is determined to be authorized to transmit on the VNI of the VXLAN frame received in Step 404, the process proceeds to Step 410. If the registered VTEP is determined to not be authorized to transmit on the VNI of the received VXLAN frame, the process proceeds to Step 408. In Step 408, the VXLAN frame is denied/dropped and the process ends.

Turning to Step 410, in Step 410, the VXLAN frame is processed by the network device. Processing the VXLAN frame may include allowing the VXLAN frame to be processed in accordance with the included functionality of the network device. Processing the VXLAN frame by the network device may include applying additional network policies to the VXLAN frame, propagating the VXLAN frame through the network device, preparing the VXLAN frame to be sent from an interface of the network device, and/or sending the VXLAN frame from an interface of the network device. After the VXLAN frame is processed, the process ends.

Figure 5:
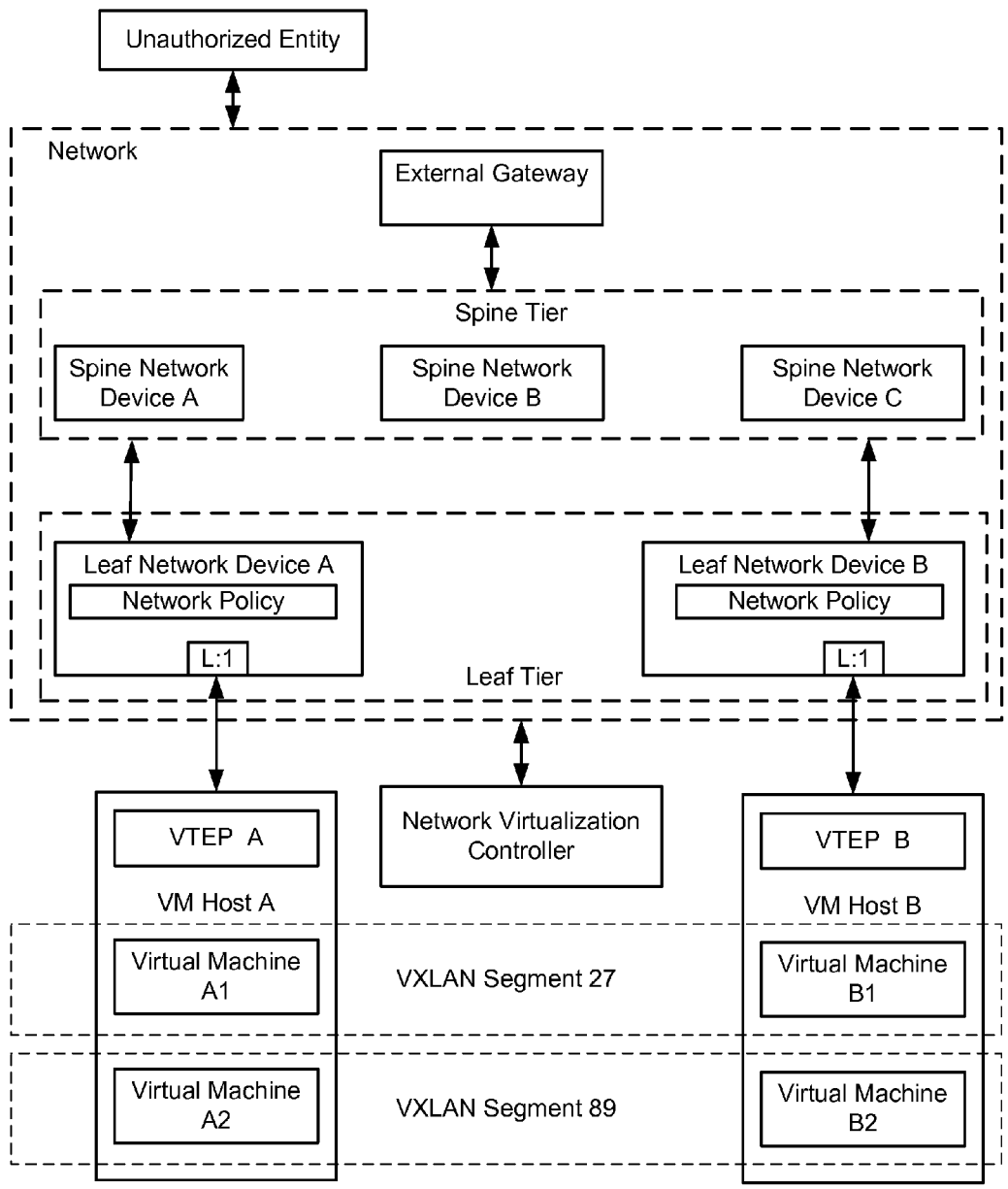
FIG. 5 shows an example in accordance with one or more embodiments of the invention.

FIG. 5 shows an example in accordance with one or more embodiments of the invention. The example is not intended to limit the scope of the invention.

Referring to FIG. 5, consider a scenario in which a network includes a hierarchy of network devices. At the apex of the hierarchy is an external gateway that provides connectivity between the network and the Internet. The external gateway is operatively connected to each network device in a spine tier, which includes spine device A, spine device B, and spine device C. Each spine device is an L2 switch. Each spine device is operatively connected to each network device in a leaf tier, which includes leaf network device A and leaf network device B. Each leaf network device is a multi-layer switch. Each leaf network device includes a copy of a network policy. The network policy includes a rule that any VXLAN frame received at an interface of the leaf network device should be dropped. The network policy is applied to all interfaces of each leaf network device. Interface L:1 of leaf network device A is operatively connected to VM host A. VM host A includes VTEP A, virtual machine A1, and virtual machine A2. Virtual machine A1 is assigned to a L2 domain identified by VNI 27. Virtual machine A2 is assigned to a L2 domain identified by VNI 89. Interface L:1 of leaf network device B is operatively connected to VM host B. VM host B includes VTEP B, virtual machine B1, and virtual machine B2. Virtual machine B1 is assigned to a L2 domain identified by VNI 27. Virtual machine B2 is assigned to a L2 domain identified by VNI 89. A network virtualization controller is operatively connected to the network.

In the above-described scenario, VTEP A and VTEP B are registered VTEPs. This means they are both registered with the network virtualization controller. Each leaf network device receives an updated list of IP addresses of registered VTEPs (i.e., a list of registered VTEP identifiers) from the network virtualization controller once per second, which is stored on the network device. Each leaf network device includes functionality to determine the IP address of any VTEP operatively connected to an interface of the leaf network device. Each leaf network device compares the list of IP addresses of registered VTEPs received from the network virtualization controller with the IP addresses of operatively connected VTEPs. In this example, because VTEP A is a registered VTEP, leaf network device A determines, using the IP address of VTEP A that interface L:1 is operatively connected to a registered VTEP (i.e., VTEP A). Leaf network device A thus creates an exception in the network policy for interface L:1. The exception is one that ceases causing VXLAN frames that arrive at interface L:1 of leaf network device A to be dropped, and instead allows the received VXLAN frames to be further processed by the network device. Similarly, leaf network device B creates an exception for its interface L:1 to which VM host B is operatively connected because VTEP B is a registered VTEP.

Additionally, leaf network device A, using a discovery protocol (e.g., a link layer discovery protocol), discovers that virtual machine A1 and virtual machine A2 are operatively connected to VTEP A of VM host A. Information related to the virtual machines (e.g., MAC address) is used by the network device to determine that virtual machine A1 is assigned to VNI 27, and virtual machine A2 is assigned to VNI 89. Leaf network device A then stores record that VTEP A is authorized to transmit on both VNI 27 and VNI 89. Similarly, VM host B discovers that virtual machine B1 and virtual machine B2 are operatively connected to VTEP B of VM host B. Information related to the virtual machines (e.g., MAC address) is used by the network device to determine that virtual machine B1 is assigned to VNI 27, and virtual machine B2 is assigned to VNI 89. Leaf network device B then stores record that VTEP B is authorized to transmit on both VNI 27 and VNI 89.

Continuing the above described scenario, virtual machine A1 generates a MAC frame. The MAC frame is then received by VTEP A, which encapsulates the MAC frame into a VXLAN frame that includes the IP address of VTEP A as the source IP address in the outer IP header, VNI 27 in the VXLAN header, and UDP port 4789 as the destination UDP port in the outer UDP header. The VXLAN frame is sent to interface L:1 of leaf network device A. Leaf network device A examines the received frame and determines that it includes UDP port 4789 as the destination UDP port in the outer UDP header and thus determines that the frame is indeed a VXLAN frame. Because VTEP A is a registered VTEP, the network policy for dropping VXLAN packets has an exception for interface L:1 of leaf network device A, allowing VXLAN frames to be further processed by leaf network device A.

Having determined that the received frame is a VXLAN frame, leaf network device A then examines the VXLAN frame to determine the source IP address in the outer IP header, which is the IP address of VTEP A. Because the IP address of VTEP A is the IP address that leaf network device A expects to see in the source IP address field of the outer IP header (which is because VTEP A is the operatively connected registered VTEP), leaf network device A allows the VXLAN frame to continue being processed (i.e., the VXLAN frame is not dropped at this point).

Having determined that the received frame is indeed a VXLAN frame that arrived at an interface operatively connected to a registered VTEP and included the IP address of that registered VTEP as the source IP address in the outer IP header, leaf network device A then checks the VNI of the VXLAN frame. Leaf network device A, as mentioned above, has determined that VTEP A is authorized to transmit on VNI 27 and VNI 89. The VXLAN frame received at port L:1 includes VNI 27 in the VXLAN header, which is the VNI to which virtual machine A is assigned. Because VNI 27 is a VNI on which VTEP is allowed to transmit, leaf network device A allows the VXLAN frame to be further processed (e.g., a route determined and the VXLAN frame sent out of the appropriate interface) by leaf network device A.

Now consider a scenario in which the above described network is subject to an attempt at unauthorized access by an unauthorized entity, who is probing the network for weaknesses, which may be later exploited. The unauthorized entity first decides to attempt to inject a VXLAN frame into the network from outside the network. To this end, the unauthorized entity crafts a first crafted VXLAN frame that includes UDP port 4789 as the destination UDP port in the outer UDP header, a fabricated IP address as the source IP address in the outer IP header, VNI 32 in the VXLAN header, and appropriate destination information to get the VXLAN frame past the external gateway of the network.

The first crafted VXLAN frame arrives at the external gateway, which determines from the destination IP address that the first crafted VXLAN frame is destined for virtual machine B2 of VM host B. The external gateway rewrites the next-hop MAC address in the outer Ethernet header to be the MAC address corresponding to leaf network device B and sends the first crafted VXLAN frame to spine network device C. Spine network device C uses the MAC address in the next-hop MAC address field of the outer Ethernet header to bridge the first crafted VXLAN frame to leaf network device B. Spine network device C is operatively connected to interface L:7 (not shown) of leaf network device B. Leaf network device B has applied the network policy for dropping all VXLAN frames to every interface other than interface L:1, because interface L:1 is the only interface operatively connected to a registered VTEP. Thus, when the first crafted VXLAN frame arrives at interface L:7 of leaf network device B, the leaf network device B examines the frame, discovers that it is a VXLAN frame via including a destination UDP port of 4789, and drops the VXLAN frame.

Undeterred by this failure, the unauthorized entity then manages to gain physical access to the site at which the network devices and VM hosts are physically located. The unauthorized entity discovers leaf network device A, and determines that VM host A is operatively connected to interface L:1. The unauthorized entity surmises that if a VXLAN frame were to arrive at an interface of leaf network device A on which a VXLAN frame is expected to arrive, then VXLAN frame will be allowed into the network. To this end, the unauthorized entity unplugs the cable that is plugged into interface L:1 of leaf network device A and plugs in a laptop. The unauthorized entity then again sends the first crafted VXLAN frame to leaf network device A. This time, because the first crafted VXLAN frame arrives at an interface that leaf network device A has recorded as being connected to a registered VTEP, the first crafted VXLAN frame is not dropped after determining that the frame is a VXLAN frame. However, leaf network device A then examines the VXLAN frame to determine the IP address in the source IP address field of the outer IP header, which is the fabricated IP address that was created by the unauthorized entity. Leaf network device A then compares the fabricated source IP address of the first crafted VXLAN frame with the expected IP address of VTEP A. Because these two IP addresses do not match, the first crafted VXLAN frame is again dropped by leaf network device A.

Still undeterred, the unauthorized entity manages to figure out that leaf network device A expects to see VXLAN frames with the IP address of VTEP A as the source IP address in the outer IP header of received VXLAN frames. The unauthorized entity then manages to obtain the IP address of VTEP A. Next, the unauthorized entity generates a second crafted VXLAN frame. The second crafted VXLAN frame is the same in all regards to the first crafted VXLAN frame, except that instead of a fabricated IP address in the source IP address field of the outer IP header, the source IP address is now the IP address of VTEP A. The unauthorized entity then sends the second crafted VXLAN frame to interface L:1 of leaf network device A. This time, because the second crafted VXLAN frame arrives at an interface that leaf network device A has recorded as being connected to a registered VTEP, the second crafted VXLAN frame is not dropped after determining that the frame is a VXLAN frame. Furthermore, when leaf network device A compares the IP address in the source IP address field of the outer IP header of the second crafted packet with the expected VTEP A IP address, the two IP addresses match, and thus the second crafted VXLAN frame is not dropped at this point. However, leaf network device A then examines the second crafted VXLAN frame to determine the VNI in the VXLAN header. The VNI in the VXLAN header is determined to be VNI 32. Leaf network device compares this VNI with the list of VNIs on which VTEP A is authorized to transmit. As mentioned previously, the list of VNIs on which VTEP A is authorized to transmit includes VNI 27 and VNI 89. Because VNI 32 is not on the list, the second crafted VXLAN frame is dropped.

The unauthorized entity is unable to discover the VNIs on which VTEP A is authorized to transmit. Thwarted, the unauthorized entity gives up and ceases attempting to access the network.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for securing a virtual extensible local area network (VXLAN) environment, the method comprising:
    configuring a default network policy on a network device for dropping all VXLAN frames comprising a VXLAN attribute, wherein the network policy is associated with a plurality of interfaces of the network device;
    obtaining, by the network device, a plurality of registered VXLAN tunnel endpoint (VTEP) identifiers;

determining, using the plurality of registered VTEP identifiers, that a first interface of the plurality of interfaces of the network device is operatively connected to a first registered VTEP associated with a first registered VTEP identifier of the plurality of registered VTEP identifiers;

disassociating the default network policy from the first interface based on the determination that the first interface is operatively connected to the first registered VTEP;

receiving, at the first interface of the network device, a frame;

performing a first verification that the frame is a first VXLAN frame by examining the frame to determine that the frame comprises the VXLAN attribute;

performing a second verification to determine that the first VXLAN frame comprises a first registered VTEP identifier;

allowing, based on the first verification and the second verification, the network device to process the first VXLAN frame; and processing, by the network device, the first VXLAN frame.

2. The method of claim 1, further comprising:

receiving, at a second interface of the plurality of interfaces of the network device, a second VXLAN frame, wherein the second VXLAN frame comprises a second VXLAN attribute;

performing a third verification, by the network device, that the second VXLAN frame comprises the second VXLAN attribute; and dropping, by the network device, the second VXLAN frame based on the default network policy.

3. The method of claim 1, wherein the first VXLAN frame further comprises a first VXLAN network identifier (VNI), and wherein the method further comprises:

discovering a computing device operatively connected to the first registered VTEP, wherein the first VXLAN frame encapsulates a MAC frame transmitted from the computing device;

determining a permitted VNI associated with the computing device, wherein first registered VTEP is permitted to communicate VXLAN frames that comprise the permitted VNI associated with the computing device;

performing a third verification to determine that the first VNI matches the permitted VNI associated with the computing device; and allowing, based on the third verification, the network device to further process the first VXLAN frame.

4. The method of claim 3, further comprising:

receiving at the first interface of the network device a second VXLAN frame comprising a second VNI;

performing a fourth verification to determine that the second VNI does not match the permitted VNI associated with the computing device;

dropping, by the network device, the second VXLAN frame based on the fourth verification.

5. The method of claim 3, wherein the computing device is a virtual machine (VM).

6. The method of claim 1, wherein the plurality of registered VTEP identifiers is obtained by the network device from a network virtualization controller.

7. The method of claim 1, wherein the first VXLAN attribute is a universal datagram protocol (UDP) port number, and wherein the method further comprises determining that the UDP port number of the first VXLAN frame is a VXLAN UDP port number.

8. The method of claim 1, wherein the first registered VTEP is executing on a virtual machine (VM) host.

9. The method of claim 1, wherein the first registered VTEP is executing on a second network device operatively connected to the network device.

10. A system used to secure a virtual extensible local area network (VXLAN) environment, the system comprising:

a computing device configured to transmit a first media access control (MAC) frame to a first registered virtual tunnel end point (VTEP);

the first registered VTEP, wherein the first registered VTEP is configured to send a first VXLAN frame to a network device; and a network device operatively connected to the first computing device, comprising a first interface and a default network policy that is associated with a plurality of interfaces of the network device for dropping VXLAN frames comprising a VXLAN attribute, and configured to:

obtain a plurality of registered VXLAN tunnel endpoint (VTEP) identifiers;

determine, using the plurality of registered VTEP identifiers, that the first interface is operatively connected to a first registered VTEP associated with a first registered VTEP identifier of the plurality of registered VTEP identifiers;

disassociate the default network policy from the first interface based on the determination that the first interface is operatively connected to the first registered VTEP;

receive, at the first interface of the network device, a frame;

perform a first verification that the frame is a first VXLAN frame by examining the frame to determine that the frame comprises the VXLAN attribute;

perform a second verification to determine that the first VXLAN frame comprises a first registered VTEP identifier;

allow, based on the first verification and the second verification, the network device to process the first VXLAN frame; and process, by the network device, the first VXLAN frame.

11. The system of claim 10, wherein the network device further comprises a second interface, wherein the system further comprises a second computing device operatively connected to the second interface of the network device, and wherein the network device is further configured to:

receive, at a second interface, a second VXLAN frame, wherein the second VXLAN frame comprises a second VXLAN attribute;

perform a third verification, by the network device, that the second VXLAN frame comprises the second VXLAN attribute; and drop the second VXLAN frame based on the network policy.

12. The system of claim 10, wherein the first VXLAN frame further comprises a first virtual network identifier (VNI), and wherein the network device is further configured to:

discover the computing device is operatively connected to the first registered VTEP, wherein the first VXLAN frame encapsulates a MAC frame transmitted from the computing device;

determine a permitted VNI associated with the computing device, wherein first registered VTEP is permitted to communicate VXLAN frames that comprise the permitted VNI associated with the computing device;

perform a third verification to determine that the first VNI matches the permitted VNI associated with the computing device; and allow, based on the third verification, the network device to further process the first VXLAN frame.

13. The system of claim 12, wherein the network device is further configured to:

receive, at the first interface, a second VXLAN frame comprising a second VNI;

perform a fourth verification to determine that the second VNI does not match the permitted VNI associated with the computing device; and drop the second VXLAN frame based on the fourth verification.

14. The system of claim 10, wherein the network device is one selected from a group consisting of a switch, a router, and a multi-layer switch.

15. The system of claim 10, wherein the plurality of registered VTEP identifiers is obtained by the network device from a network virtualization controller.

16. The system of claim 10, wherein the first VXLAN attribute of the first VXLAN frame is a universal datagram protocol (UDP) port number, and wherein the network device is further configured to determine that the UDP port number is a VXLAN UDP port number.

17. The system of claim 10, wherein the first registered VTEP executes on a virtual machine (VM) host.

18. The system of claim 10, wherein the first registered VTEP executes on a second network device operatively connected to the network device.

19. The system of claim 10, wherein the first registered VTEP executes on a second network device operatively connected to the network device and wherein the computing device is one selected a group consisting of a server, a desktop computer, and a mobile device.

20. A non-transitory computer readable medium comprising instructions, which when executed by a processor, perform a method for securing a virtual extensible local area network (VXLAN) environment, the method comprising:

configuring a default network policy on a network device for dropping all VXLAN frames comprising a VXLAN attribute, wherein the default network policy is associated with a plurality of interfaces of the network device;

obtaining, by the network device, a plurality of registered VXLAN tunnel endpoint (VTEP) identifiers;

determining, using the plurality of registered VTEP identifiers, that a first interface of the plurality of interfaces of the network device is operatively connected to a first registered VTEP associated with a first registered VTEP identifier of the plurality of registered VTEP identifiers;

disassociating the default network policy from the first interface based on the determination that the first interface is operatively connected to the first registered VTEP;

receiving, at the first interface of the network device, a frame;

performing a first verification that the frame is a first VXLAN frame by examining the frame to determine that the frame comprises the VXLAN attribute;

performing a second verification to determine that the first VXLAN frame comprises a first registered VTEP identifier;

allowing, based on the first verification and the second verification, the network device to process the first VXLAN frame; and processing, by the network device, the first VXLAN frame.

* * * * *